United States Patent [19]

Riccio

[11] 3,982,668
[45] Sept. 28, 1976

[54] AEROSOL DISPENSER FOR PLURALITY OF FLUENT MATERIALS

[75] Inventor: Pasquale R. Riccio, Salem, N.H.

[73] Assignee: Ciba-Geigy Corporation, Ardsley, N.Y.

[22] Filed: Oct. 4, 1974

[21] Appl. No.: 512,321

[52] U.S. Cl. .................................. 222/95; 222/136; 222/402.18; 239/307
[51] Int. Cl.² ........................................ B65D 83/14
[58] Field of Search ................ 222/92, 94, 95, 105, 222/129, 135, 136, 145, 173, 183, 193, 402.18, 402.24; 239/307, 308

[56] References Cited
UNITED STATES PATENTS

| | | | |
|---|---|---|---|
| 3,455,489 | 7/1969 | Meshberg | 222/136 X |
| 3,606,963 | 9/1971 | Marand | 222/402.18 X |
| 3,615,042 | 10/1971 | Marand | 222/402.24 X |
| 3,674,180 | 7/1972 | Morane | 222/402.18 X |
| 3,693,837 | 9/1972 | Yuhas | 222/94 |
| 3,704,814 | 12/1972 | Ruscitti | 222/145 |

*Primary Examiner*—Robert B. Reeves
*Assistant Examiner*—Joseph J. Rolla
*Attorney, Agent, or Firm*—Wenderoth, Lind & Ponack

[57] ABSTRACT

An aerosol type dispenser has a plurality of sources of fluent materials to be dispensed and a source of propellant gas under pressure exerting pressure on the fluent materials. The sources of fluent material is a rigid container holding one fluent material and a further collapsible container within the rigid container holding a second fluent material, and the source of propellant gas is a mass of compressed propellant gas in the container above the one fluent material and at least partially surrounding the second container. A valve member on the container has fluent material flow path means forming a path for pressurized fluent material through the valve member from the sources of fluent material, and the valve member further has a pressurized gas, i.e. propellant, flow path therethrough from the source of propellant gas. The valve member has an obturating member actuated by the movement of a valve stem for obturating the flow paths. A dispensing nozzle is provided having a pressurized fluent material passage directed out of the dispensing nozzle, and having a pressurized gas passage intercepting the fluent material passage at substantially right angles thereto just ahead of the discharge outlet from the nozzle.

4 Claims, 8 Drawing Figures

U.S. Patent  Sept. 28, 1976  3,982,668
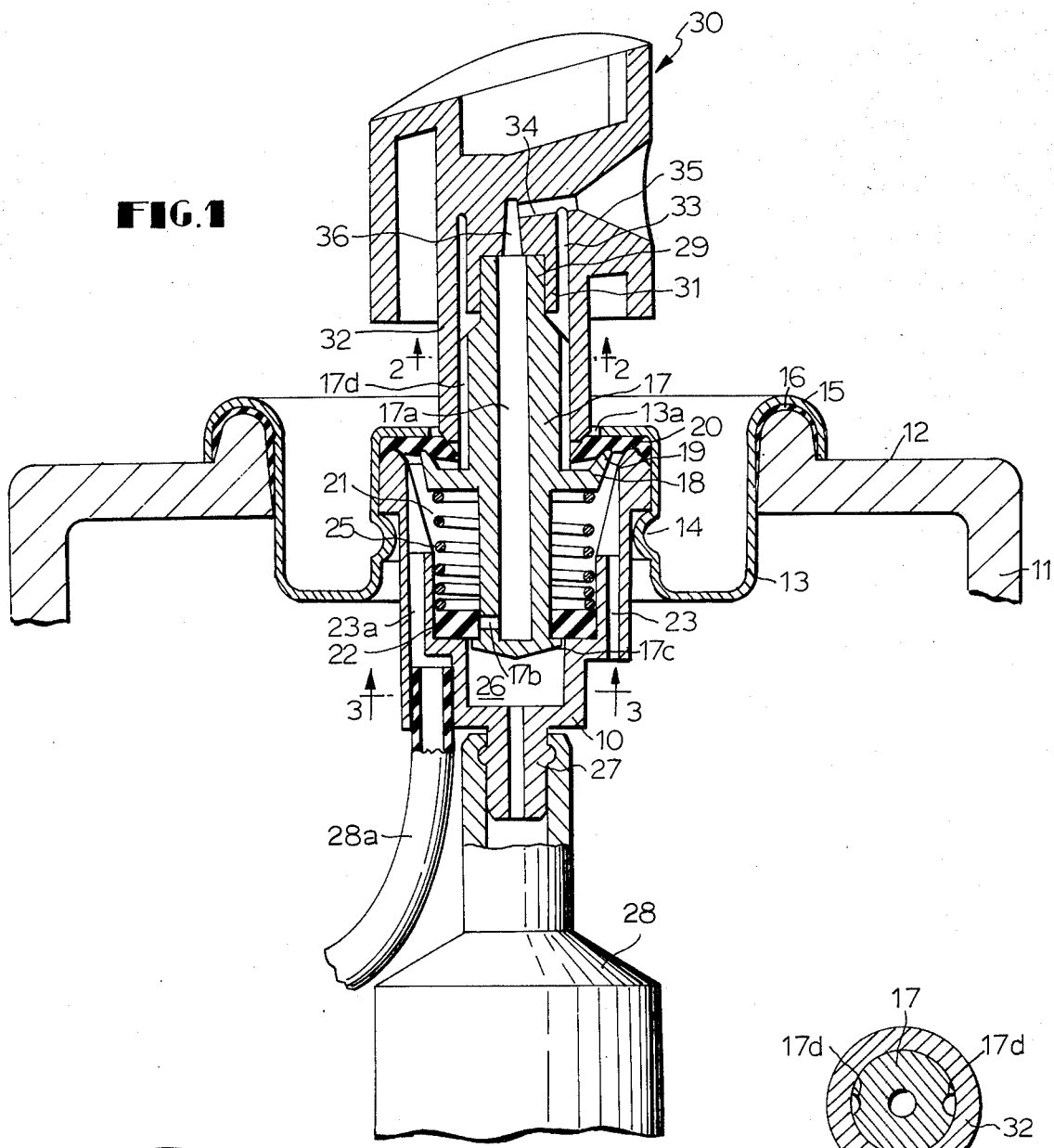
FIG.1
FIG.2
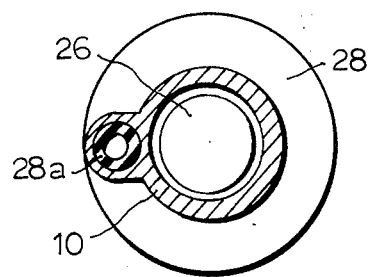
FIG.3

AEROSOL DISPENSER FOR PLURALITY OF FLUENT MATERIALS

This invention relates to an aerosol type dispenser, and more particularly to an aerosol type dispenser for dispensing a plurality of fluent materials and in which pressurized gas or vapor is mixed with pressurized fluent materials at a dispensing nozzle means in order to produce a fine spray of droplets with low propellant pressures.

BACKGROUND OF THE INVENTION AND PRIOR ART

Aerosol type dispensers have been in wide use for many years. The most commonly used type has a container in which is contained a fluent material to be dispensed. By fluent material is meant a material which will flow when subjected to the pressure of the propellant, such as a liquid or a powder. In a very common arrangement, in the space within the container above this material is a pressurized propellant vapor, such as Freon or the like, which exerts a pressure on the fluent material. A dip tube extending downwardly into the container and having a valve means at the top thereof, normally pushbutton actuated, acts as a control to release the fluent material, which is forced through the dip tube from the interior of the container by the pressure of the propellant on the upper surface of the fluent material. In another arrangement the fluent material is contained in a collapsible sac in place of the dip tube, and the propellant surrounds the sac and presses material out of the sac. Many proposals have been made for modifying or adding to such dispensers to make them capable of dispensing more than one fluent material.

In order that such dispensers operate properly, a relatively high pressure is required, on the order of 60 psig (about 4 Kg/cm$_2$ above ambient). While this produces relatively good atomization of the fluent being dispensed, it has the major disadvantage that the container or containers for the fluent materials must have sufficient strength to withstand this pressure within the container. This requires that special precautions, with consequent added cost, must be taken during the shipment and storage of the containers. Most of the containers carry a warning that they should be punctured before being disposed of after they have been used so as to avoid the likelihood of an explosion should the cans with only some propellant under pressure remaining in them be incinerated.

It would be highly desirable if the pressure of the propellant within the container or containers in such multi-fluent material dispensing devices could be reduced without having any detrimental effect on the quantity and the fineness of the spray of fluent materials, being dispensed. This would reduce the cost of making the containers, and it would greatly simplify and make much less dangerous the transportation, storage and disposal of containers during and after their use.

OBJECTS AND BRIEF DESCRIPTION OF THE INVENTION

It is an object of the present invention to provide an aerosol type dispenser in which the dispensing means makes possible the dispensing of a plurality of fluent materials in a propellant at a relatively low pressure.

It is a further object of the invention to provide an aerosol type dispenser in which the fluent materials can be dispensed in a very fine spray, with droplets of extremely small sizes on the order of a few microns, by means of a propellant in the dispenser at a pressure on the order of 20 psig (about 1.5 Kg/cm$^2$ above ambient).

These objects are achieved by the provisions of an aerosol type dispenser having a plurality of sources of fluent materials to be dispensed and a source of propellant gas under pressure exerting pressure on the fluent materials. The sources of fluent material can be a rigid container holding one fluent material and a further collapsible container within the rigid container holding a second fluent material, and the source of propellant gas can be a mass of compressed propellant gas in the container above the one fluent material and at least partially surrounding the second container. Valve means on the container has fluent material flow path means forming a path for pressurized fluent material through the valve means from the sources of fluent material, and the valve means further has a pressurized gas, i.e. propellant, flow path therethrough from the source of propellent gas. The valve means has obturating means actuated by the movement of a valve stem for obturating the flow paths. Dispensing nozzle means is provided having a pressurized fluent material passage directed out of the nozzle dispensing means, and having a pressurized gas passage intercepting the fluent material passage at substantially right angles thereto just ahead of the discharge outlet from the nozzle means. With this configuration, the pressurized fluent materials leaving the dispensing nozzle means are sheared by the pressurized gas, which exerts a mechanical breaking action on the stream of pressurized fluent material as it leaves the nozzle means. This produces an extremely fine spray with droplets on the order of a few microns when the pressurized gas, i.e. propellant, has a pressure as low as a pressure on the order of 20 psig.

BRIEF DESCRIPTION OF THE FIGURES

These objects and other objects will become apparent from the following description, taken together with the accompanying drawings, in which:

FIG. 1 is a transverse sectional view of the upper portion of an aerosol type dispenser according to the present invention with the parts in the rest or nondispensing positions;

FIG. 2 is a section taken on line 2—2 of FIG. 1;

FIG. 3 is a section taken on line 3—3 of FIG. 1;

DETAILED DESCRIPTION OF THE INVENTION

Figure 4:
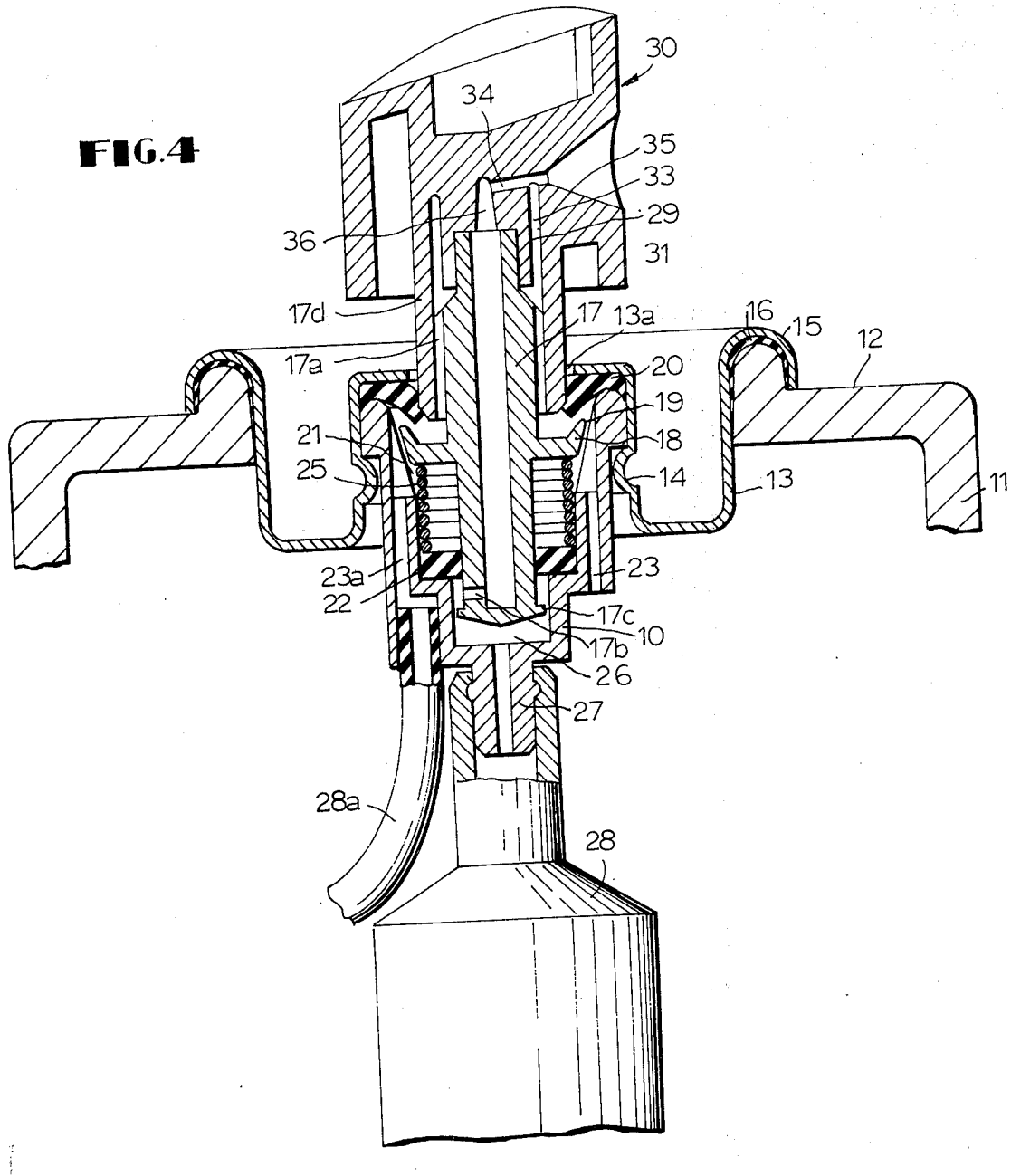
FIG. 4 is a sectional view similar to FIG. 1 with the parts in the dispensing positions.

Referring to FIGS. 1–3, the aerosol type dispenser according to the present invention has a container 11, only the upper portion of the side wall of which is shown, which has a container top wall or cover portion 12 at the upper end thereof. The container is for holding a source of a first fluent material, such as a liquid or a finely divided powdered material, to be dispensed, and a quantity of a propellant gas under pressure. The propellant is in the space above the first fluent material within the container 11 and exerts pressure directly on the fluent material.

Valve means is provided on the container which comprises a support 10 having a hollow stem 17 movably mounted therein. The support 10 is mounted on the underside of a mounting member in the form of a mounting cup 13. In the present arrangement, the central portion of the mounting cup 13 is bent over the upper end of the support 10 and secured thereto by an annular crimp 14, which is deformed under the overhanging edge of the upper portion of support 10. The mounting cup 13 has a lip 15 which overhangs a corresponding upwardly projecting annular portion on the container top wall 12, and the cup 13 is sealed to the annular portion by a flowed-in gasket 16. The mounting cup 13 has a central opening 13a through which the stem 17 is freely movable, and secured between the upper end of the support 10 and the cup 13 is a second or outer stem sealing gasket 20, which will be described in greater detail hereinafter.

Immediately below the gasket 20 on the stem 17 is a flange 18 which has an upwardly projecting annular lip 19, when the stem is in the raised position, as in FIG. 1, engages tightly against the sealing gasket 20. The lower portion of the stem 17 and the flange 18 are positioned within the hollow interior 21 of the support 10. At the bottom of the hollow interior 21 is a first or inner stem sealing gasket 22, which is held in position by a return spring 25 extending between the gasket 22 and the bottom surface of the flange 18. A bore 23 opens through the support 10 into the hollow interior 21 from the interior of the container 11.

The lower end of the hollow stem 17 extends through the sealing gasket 22, and has a lateral opening 17b opening out of the longitudinal central duct 17a of the stem. In the rest or raised position of the stem, the lateral opening 17b is obturated by the sealing gasket 22.

The lower end of the support 10 has a stem guide extension 24 thereon within which is a stem guide recess 26 in which the flange 17c on the lower end of the stem is guided during vertical movement of the stem. Projecting downwardly from the lower end of the stem guide extension 24 is a container receiving projection 27 having a bore 27a extending therethrough from the recess 26 outwardly to the space within container 11. A collapsible container 28 has the neck thereof fitted tightly over the projection 27, and extends downwardly into the container 11. The second fluent material is contained in the flexible container 28, and the pressure of propellant in the space within container 11 exerts a pressure on the second fluent material through the wall of container 28 without actually contacting the second fluent material. The second fluent material can, for example, be a fluent material which is incompatible with the propellant during storage.

A further bore 23a opens through the support 10 into the hollow interior 21 from the interior of container 11, and a dip tube 28a has the upper end tightly fitted into a dip tube receiving recess in the support 10, and it extends downwardly into the container 11.

Along the outer portion of the upper end of the stem 17 are stem grooves 17d which terminate at a beveled portion which narrows to a pushbutton receiving projection 29 on the upper end of the stem 17.

A pushbutton 30 is fitted tightly over the upper end of the stem 17, and has nozzle dispensing means therein. A pressurized fluent material passage 34 extends laterally of a pushbutton 30 and has a diverging portion 35 at the end thereof. An inner sleeve 31 depending from the pushbutton 30 fits tightly over the pubhbutton receiving projection 29, and has a liquid passage 36 therewithin extending up to the pressurized fluent material passage 34. An outer sleeve 32 which is concentric with and spaced outwardly from the inner sleeve 31 depends from the pushbutton 30 and fits tightly around the portion of the stem 17 having the groove 17d therein. Outer sleeve 32 extends down to and into sealing contact with the inner edge of sealing gasket 20 where it extends inwardly past the edge of opening 13a in mounting cup 13. The annular recess 33 defined between the inner and outer sleeves is a pressurized gas passage which extends upwardly to the point where it intersects the passage 34 at substantially right angles thereto at a point just before the passage opens into the diverging portion 35.

It will thus be seen that in the valve means there is provided fluent material flow path means defining fluent material flow paths from the container 28 and the dip tube 28a through the valve means. In this embodiment, one such path is made up of the bore 27a in projection 27, stem guide recess 26, the lateral opening 17b, the hollow center 17a of the stem 17, the liquid passage 36, and the pressurized fluent material passage 34. This fluent material flow path is obturated by the obturating means in the form of the inner stem sealing gasket 22, as the stem moves through this gasket in its up and down movement. The second such path is through bore 23a, hollow interior 21, grooves 17d, and recess 33 opening into passage 34. This second path is obturated by the outer stem sealing gasket 20 which is acted on by the flange 18 during movement of the stem up and down.

There is also provided in the valve means a pressurized gas flow path extending through the bore 23 into the hollow interior 21 then through the grooves 17d and the annular recess 33. This pressurized gas flow path is also obturated by obturating means in the form of the outer stem sealing gasket 20. It will be seen that in this embodiment, the gas flow path and one of the fluent material flow paths partially coincide and the coincident portions are obturated by a single obturating means, i.e. gasket 20.

With the parts of the positions as shown in FIG. 1–3, the pressurized fluent material flow paths are closed, since the lateral opening 17b within the inner stem sealing gasket 22, so that fluent material from container 28 which is forced into the recess 26 by the pressure of the propellant within the space in the container 11 above the fluent material acting on the outside of container 28 cannot flow past the obturating means, and the lip 19 on the flange 18 on the stem 17 is pressed tightly against the outer stem sealing gasket 20, so that fluent material from container 11 cannot flow past the obturating means. The pressurized gas-flow path is obturated by this same obturating means, i.e. lip 19 and gasket 20.

When the stem is depressed by finger pressure on the push button 30, the parts will move to the positions as shown in FIG. 4, that is, the stem will move downwardly, compressing the spring 25 and the lateral opening 17b will move to a level below the inner stem sealing gasket 22. This opens the pressurized fluent material flow path for the fluent material in container 28, causing this pressurized fluent material to flow up the hollow interior 17a of the stem 17, through the liquid passage 36 and the pressurized fluent material passage 34 and outwardly into the diverging portion 35. This liquid is under some pressure, and even without more, there will tend to be considerable dispersion, and there will be a spray of sorts formed. However, at the time of the downward movement of the stem 17, the lip 19 moves away from the outer stem sealing gasket 20 and the lower end of the outer sleeve 32 depresses the inner edge of the outer stem sealing gasket 20, thereby opening a passage past the lip 19 and under the edge of the gasket 20. Pressurized gas is thus free to flow through the hollow interior 21 and up the grooves 17d into the annular recess 33 and then into the passage 34. At the same time fluent material in container 11 is free to flow upwardly through dip tube 28a, bore 23a and hollow interior 21 under the pressure of the propellant gas in the space above the fluent material in container 11. In hollow interior 21, the fluent material and propellant gas will be mixed, and then flow past gasket 20 to the pushbutton 30.

Since the flow of the mixture of pressurized gas and fluent material into the passage 34 is at substantially right angles to the flow of the pressurized fluent material therealong, the pressurized mixture exerts a breaking or shearing action on the pressurized fluent material, thereby breaking it up into extremely fine droplets as it is dispersed in a spray through the diverging portion 35.

It has been found that by using pressures in the range of 15 to 20 psig (about 1.5 Kg/cm² above ambient) for the pressurized gas, i.e. the propellant, and where the nozzle sizes are similar to those currently in use in conventional dispensers of this type, a spray of extremely fine droplets can be obtained in which a greater proportion of the droplets have sizes in the range of 5 to 10 microns. Thus, the strength of the container 11 can be substantially reduced. This has the additional advantages of making the dispenser considerably safer, both during transportation and storage as well as at the time of its disposal.

Figure 5:
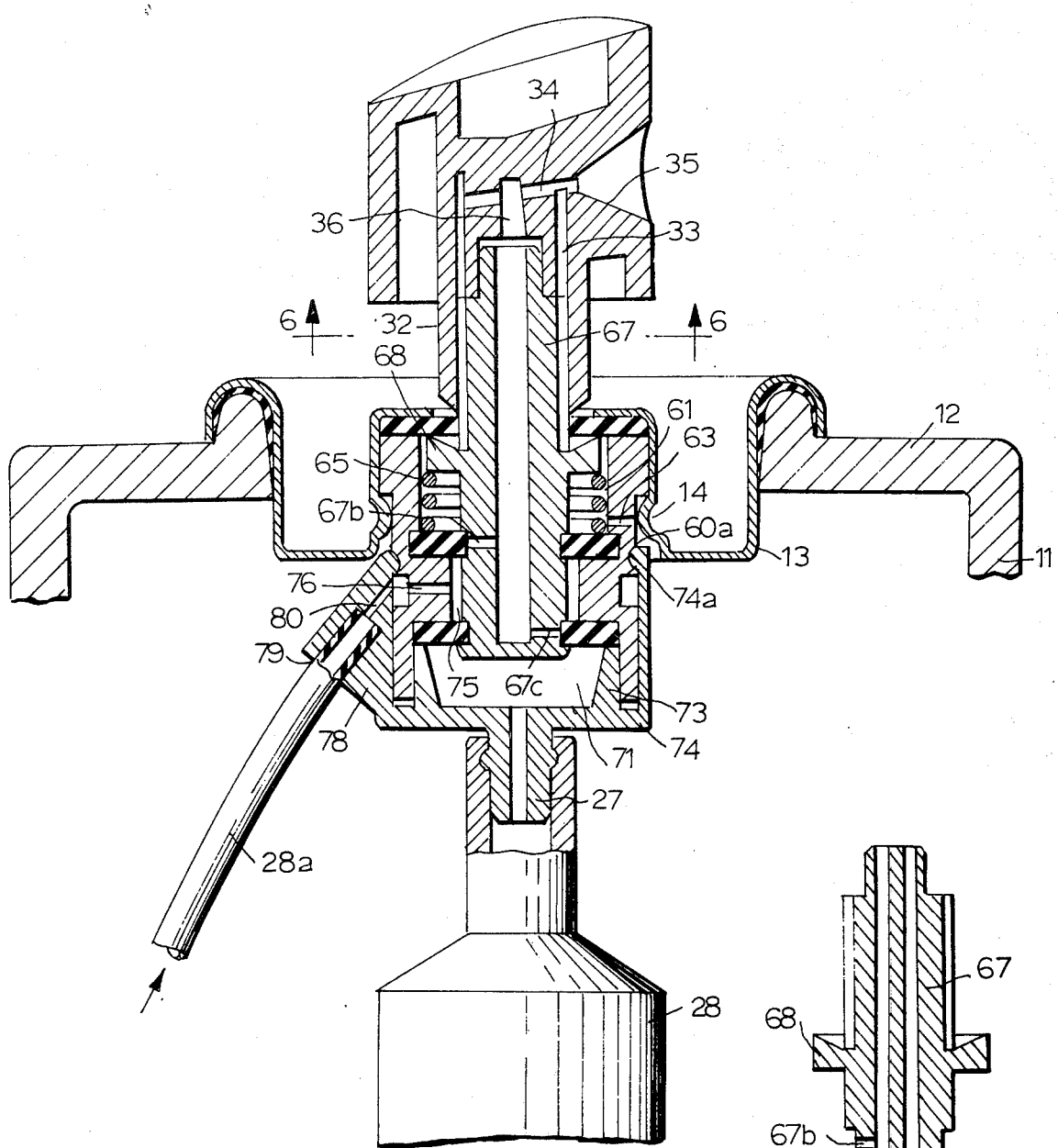
FIGS. 5–7 are views similar to FIGS. 1 and 2 of a further embodiment of the dispenser of the present invention.
Figure 6:
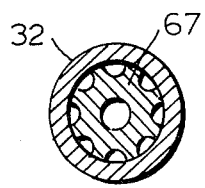
Figure 7:
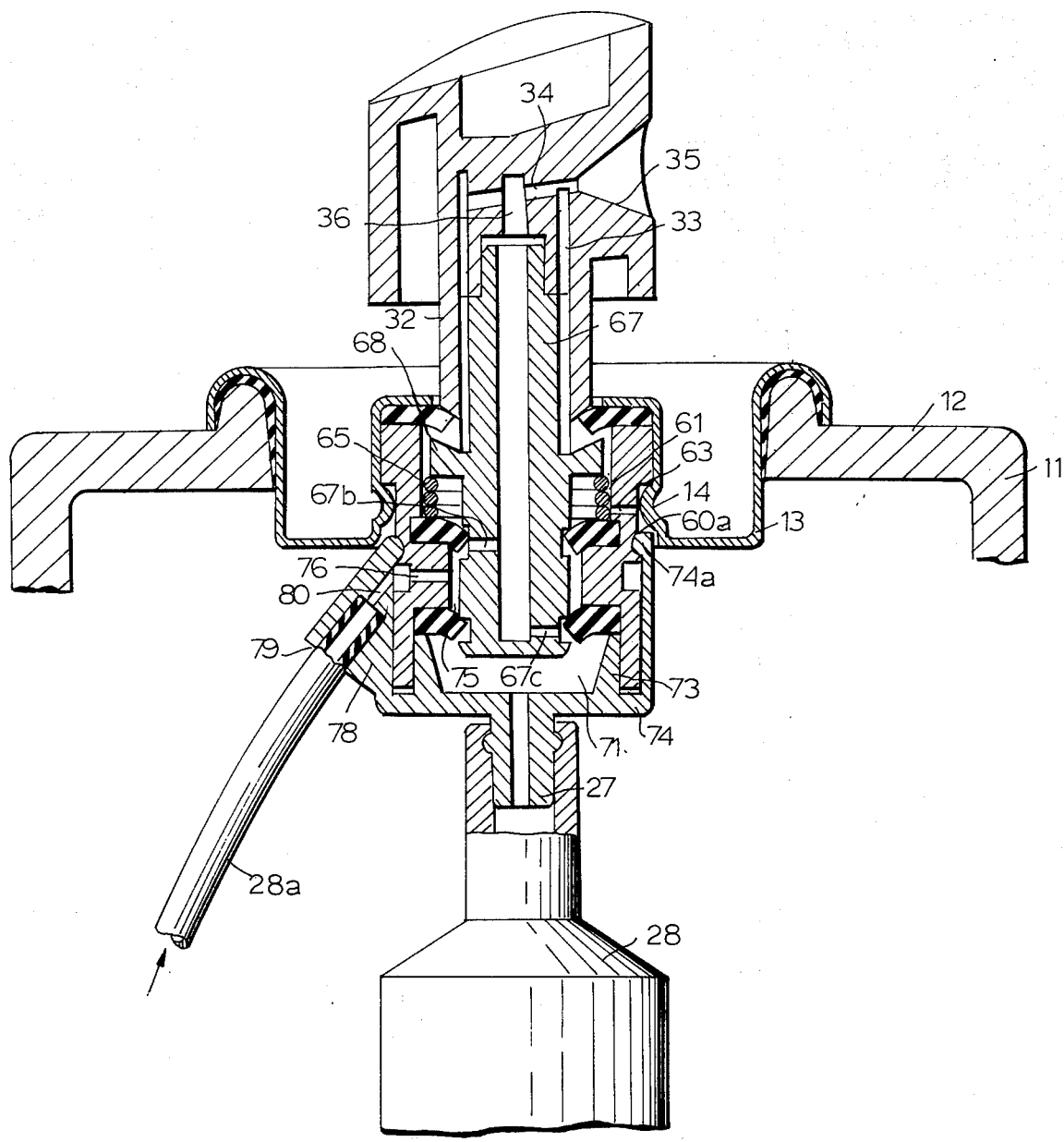

In the embodiment of FIGS. 1–4, the fluent material which is contained in the container 11, and which is forced upwardly through the dip tube 28a by the pressure of the propellant in the space above the fluent material, is mixed with the gaseous phase of the propellant in the hollow interior 21 and as it is forced upwardly through the grooves 17d to intersect the flow of the fluent material from the container 28 which is flowing out through the fluent material passage 34. However, as an alternative procedure, it is also possible to supply both the fluent materials to the fluent material passage 34 and to supply gaseous propellant separately to the bushbutton 30. One embodiment for accomplishing this is shown in FIGS. 5–7.

The structure of this embodiment is the same as that of FIGS. 1–4 insofar as it has the mounting cup 13 mounted on the container top or cover wall 12 with the flowed in gasket, and a support crimped into the mounting cup 13 by means of a crimp 14. The structure of the support 60 is, however, slightly different from that of the embodiment of FIGS. 1–4, and the valve stem is also somewhat modified.

The support 60 has the hollow interior 61 with the first stem sealing gasket 62 in the bottom thereof held down by the spring 65 which engages the flange 68 on the stem 67. The wall of the support 60 has a propellant bore 63 therethrough above the gasket 62 which opens into the space above the fluent material contained in the container 11. The stem likewise has a first lateral opening 67b which is obturated by the first stem sealing gasket 62. The bottom portion of the support 60 is modified somewhat, and has a downwardly open recess 71 therein in the inner end of which is seated a second stem sealing gasket 72 which is held in place by an upwardly extending flange 73 on a cover member 74 which fits over the bottom end of the support 60 and is held thereon, for example, by a bead 64a which engages in a groove 60a in the support 60. The container receiving projection 27 extends downwardly from the cover member 74, and the collapsible container 28 is fitted tightly over the projection 27. The stem 67 has a second lateral opening 67c which is obturated by the second stem sealing gasket 72.

It will be seen that there is thus a space 75 provided within the hollow interior of the support 60 between the first and second stem sealing gaskets 62 and 72. A fluent material bore 76 opens into this space through the support 60 from an annular groove 77 around to outside of the support 60. The cover member 74 has an extension 78 on one side thereof with a dip tube receiving recess 79 and bore 80 which open into the annular groove 77, the dip tube receiving recess 79 receiving the dip tube 28a.

The balance of the structure is also essentially the same as that of FIGS. 1–4. The outer stem sealing gasket 20 is clamped between the support 10 and the cup 13, and the pushbutton 30 is mounted on the upper end of the stem 67 in the same way as in the earlier embodiment. The stem 67 has a plurality of grooves 67d spaced therearound rather than just the two shown in FIG. 2. It will be seen that this feature, together with the provision of the annular groove 77 makes it immaterial how the parts are oriented around the central axis of the stem with respect to each other. The bores, gaskets and the like will all match correctly in all positions.

The pushbutton as shown in FIG. 5 has been modified slightly to extend the fluent material passage 34 rearwardly past the liquid passage 36 until it intersects with the annular groove 33. This causes the gaseous propellant to flow across the liquid passage 36, further improving the breaking up of the liquid flowing up the stem.

The operation of this embodiment of the dispenser will be clear from FIG. 7. When the stem is depressed, the first and second stem sealing gaskets 62 and 72 will be flexed and the lateral passages 67b and 67c will be opened so that the fluent material from the container 11, being forced upwardly through dip tube 28a and through bore 76 will flow into the hollow center of the stem 67 through lateral opening 67b, while fluent material from container 28 will flow through space 71 and lateral passage 67c into the hollow center of the stem 67. The mixed fluent materials will then flow upwardly through the stem and the nozzle, and the propellant will flow through the groove 67d into the pushbutton and mix with the liquids so that they are ejected in a spray through the divergent portion 35.

Figure 8:
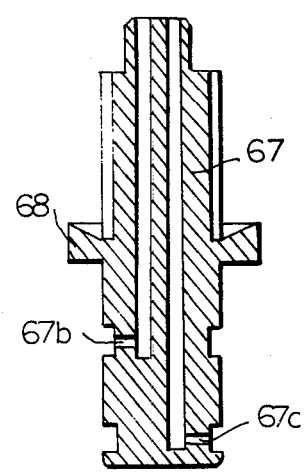
FIG. 8 is a longitudinal sectional view of an alternative embodiment of a stem for use in the embodiment of FIGS. 5–7.

If it is desired to keep the fluent materials separated until just before they reach the nozzle means in the pushbutton 30, the modified stem 97 shown in FIG. 8 can be substituted for stem 67 in FIGS. 5–7. The stem 97 has two separate central bores 98 and 99 extending from the lateral openings 97a and 97b, respectively. Mixing of the fluent materials is then delayed until they reach the liquid passage 36 in the pushbutton.

It will be seen further that the parts from which the dispenser of the present invention are made are relatively conventional and can be easily molded from plastic or like materials, and readily assembled on existing assembling equipment.

It is thought that the invention and its advantages will be understood from the foregoing description, and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. An aerosol type dispenser comprising: a plurality of sources of fluent material to be dispensed and a source of propellant gas under pressure and exerting pressure on the fluent materials of said sources of fluent material, valve means on said dispenser comprising a support, a stem movably mounted on said support, said support having a hollow interior into which said stem is movable, said stem having pressurized fluent material passage means therein and having a first lateral opening opening into said passage means and a second lateral opening opening into said passage means, gasket means in said support through which said stem is slidable in sealing engagement for closing and opening said lateral openings, one of said sources of fluent material opening into the space around the lower end of said stem to which said first lateral opening is exposed, the other of said sources opening into the hollow interior of said support to which said second lateral opening is exposed, a further gasket on said support and a flange on said stem in said hollow interior of said support engaging said further gasket when the stem is in a raised condition, said support having a bore therein communicating with said source of propellant gas and opening into said hollow interior, and a dispensing nozzle means on the end of said stem outside said support, said stem having propellant passage defining means along the outer surface thereof from said support to said dispensing nozzle means, the bore in the support, the hollow interior and the propellant passage defining means constituting a pressurized gas flow path to said nozzle means.

2. An aerosol type dispenser comprising: a plurality of sources of fluent material to be dispensed and a source of propellant gas under pressure and exerting pressure on the fluent materials of said sources of fluent material, valve means on said dispenser comprising a support, a stem movably mounted on said support, said support having a hollow interior into which said stem is movable, said stem having pressurized fluent material passage means therein and having a first lateral opening at the lower end thereon and a second lateral opening spaced above said first lateral opening, a first gasket in said support through which the lower end of said stem is slidable in sealing engagement for closing and opening said first lateral opening, one of said source of fluent material opening into the space around the lower end of said stem, a further pressurized fluent material obturating gasket in said support and through which the portion of said stem having said second lateral opening is slidable in sealing engagement for closing and opening said second lateral opening, the other of said sources of fluent material opening into the hollow interior of said support between said pressurized fluent material obturating gaskets, a further gasket on said support and a flange on said stem in said hollow interior of said support engaging said further gasket when the stem is in a raised condition, said support having a bore therein communicating with said source of propellant gas and opening into said hollow interior, and a dispensing nozzle means on the end of said stem outside said support, said stem having propellant passage defining means along the outer surface thereof from said support to said dispensing nozzle means, the bore in the support, the hollow interior and the propellant passage defining means constituting a pressurized gas flow path to said nozzle means.

3. An aerosol type dispenser as claimed in claim 2 in which said stem has a single central passage into which both of said lateral openings extend.

4. An aerosol type dispenser as claimed in claim 2 in which said stem has two passages therethrough, one from each of said lateral openings, extending to said dispensing nozzle means.

* * * * *